United States Patent [19]

Smith

[11] 4,317,797
[45] Mar. 2, 1982

[54] RESIN PURGER

[75] Inventor: Samuel C. Smith, Newton Centre, Mass.

[73] Assignee: The United States of America as represented by the Secretary of the Navy, Washington, D.C.

[21] Appl. No.: 181,272

[22] Filed: Aug. 25, 1980

[51] Int. Cl.³ .......................... B01J 19/00; B01J 19/14
[52] U.S. Cl. ........................................ 422/119; 422/3; 422/40; 422/41; 422/98
[58] Field of Search ................. 422/3, 40, 41, 9, 10, 422/83, 98, 119, 243

[56] References Cited

U.S. PATENT DOCUMENTS

| | | | |
|---|---|---|---|
| 2,616,780 | 11/1952 | Atkinson et al. | 422/9 |
| 3,188,166 | 6/1965 | Dietz et al. | 422/10 |
| 3,474,823 | 10/1969 | Finlayson et al. | 422/119 X |
| 3,704,088 | 11/1972 | Nagel et al. | 422/10 |
| 3,723,059 | 3/1973 | Thumm et al. | 422/10 |
| 3,820,687 | 6/1974 | Brock | 422/40 X |
| 3,837,808 | 9/1974 | Sugimoto et al. | 23/232 E |
| 4,066,401 | 1/1978 | Solomon | 422/40 |
| 4,261,698 | 4/1981 | Carr et al. | 422/83 X |

*Primary Examiner*—Barry Richman
*Attorney, Agent, or Firm*—R. F. Beers; Charles D. B. Curry; William C. Daubenspeck

[57] ABSTRACT

A resin purger which reliably determines when purging is completed and prevents humid air from re-entering the purged material. A sealed container has an inlet valve attached to a source of inert purge gas and an outlet valve. A diffuser is connected to the outlet valve to screen the exit gas from the container. A probe sensor detects the amount of oxygen in the exit gas and indicates when purging is complete.

9 Claims, 1 Drawing Figure

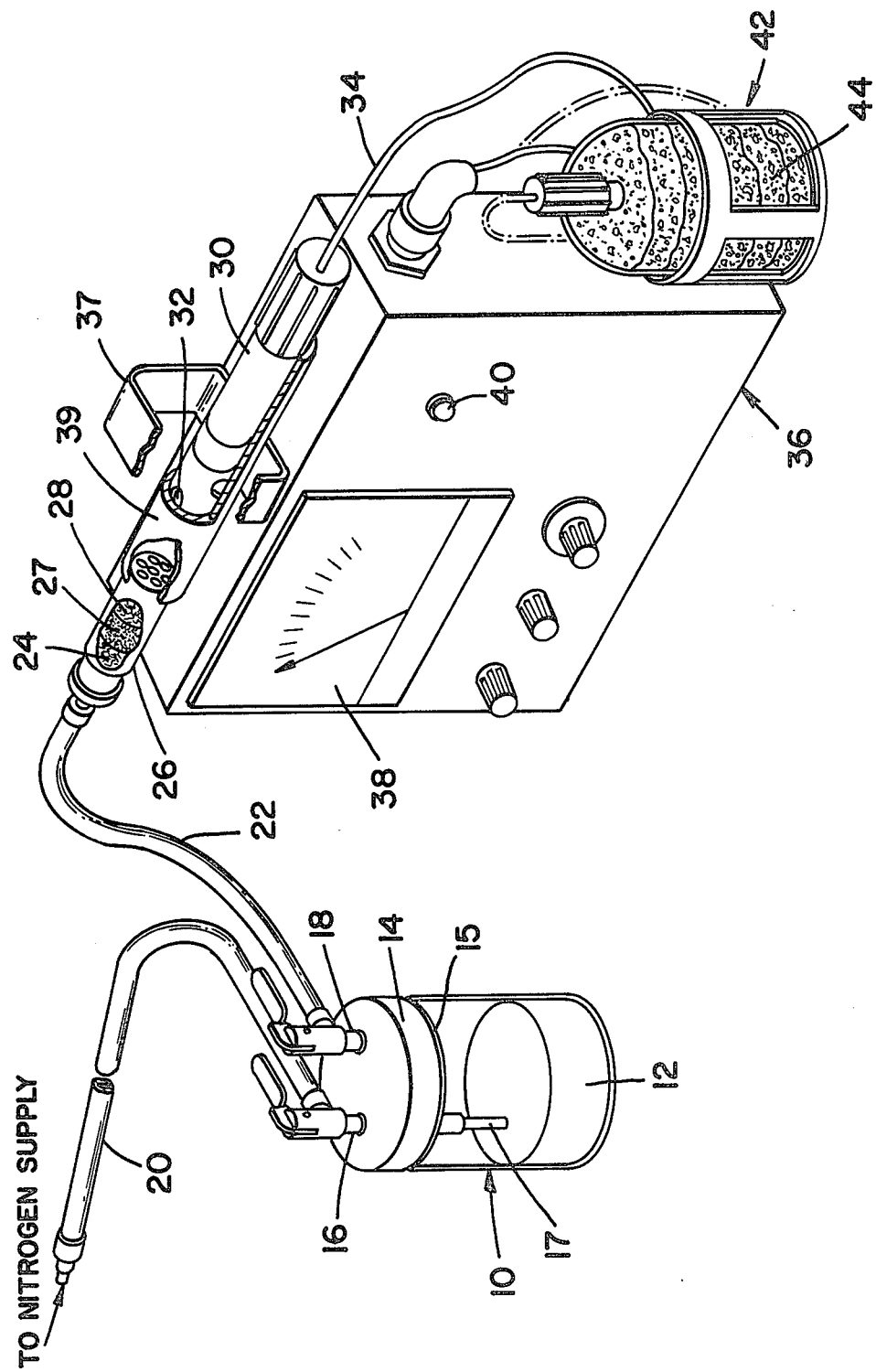

RESIN PURGER

BACKGROUND OF THE INVENTION

1. Field of the Invention

The present invention relates to an apparatus and methods of improving shelf life of resins, and more particularly to a method for controlled purging of resin materials which prevents humid air from re-entering the purged material.

2. Description of Prior Art

Resinous materials are commonly used for a wide range of commercial activities in the manufacturing, machinery and electrical industries; but more particularly, in the electronics field. For example, resins are used for potting, embedding, encapsulating and coating applications. The resins typically employed in these applications have a potential shelf life of from six to twelve months. Under the conditions of normal day-to-day use, however, the shelf life is considerably shorter. Each time a can or drum is opened for use, the resin is freshly exposed to oxygen and humidity in the surrounding air. During successive openings of the can or drum, additional oxygen and water vapor are introduced to the remaining resin. The resulting chemical reactions which occur within the unused resin markedly affect the physical and chemical properties of the resin. Thus, initially, there is the problem of non-uniformity in successive uses of the same can of resin. Eventually, the deterioration of the resin properties progresses to the point where the remaining product is unsuitable and must be discarded.

Although the concept of "purging" containers using a stream of dry, inert gas is, broadly speaking, not a new one in the chemical arts, the purging of resin containers to help realize maximum potential shelf life of unused resin must meet certain special requirements. First, the amount of purging employed must be optimized. Because the purging operation, involving generally the use of a cylinder of compressed nitrogen or similar inert gas and a certain amount of human labor, is not costless, at least a rough cost-benefit analysis is required to determine the optimum level of oxygen and moisture which should be left in the resealed resin container. Once this optimum level of purging is ascertained, the apparatus employed must be capable of easily and reliably determining when that optimum level has been attained. The length of time required for reaching this optimal level will vary according to the size and void volume of the container, the length of time the resin has been exposed to the atmosphere, and the flow rate of the dry, inert gas.

In this connection, a second special problem which arises in purging a resin container to an optimal level of oxygen and moisture reduction is the danger of additional surrounding air leaking into the container as the purging operation is completed and the container sealed. Not only would such leakage introduce additional oxygen and moisture, thereby departing from the "optimal" level, but this situation would also lead to non-uniformity of the resin during successive uses.

SUMMARY OF THE INVENTION

Accordingly, the present invention provides a resin purger which reliably determines when purging is completed and prevents humid air from re-entering the purged material. A resin container lid is equipped with an inlet valve, an outlet valve and an instrument to determine when to cease purging. A drying gas flows through the inlet valve over the surface of the resin material and the air exits the outlet valve and passes over a probe sensor which provides an output signal to stop purging when no more air is present.

Therefore, it is an object of the present invention to provide an improved apparatus and method for purging and stabilizing a container of resinous material.

Another object of the present invention is to provide a resin purger which does not allow humid air to re-enter the resin container after purging is complete.

Yet another object of the present invention is to provide a resin purger which repeatedly and accurately purges resin containers to a predetermined optimal level.

Still another object of the present invention is to provide a resin purger which is inexpensive, quick and easy to use, reliable and relatively portable.

Other objects, advantages and novel features of the present invention will be apparent from the following detailed description when read in conjunction with the appended claims and attached drawing.

BRIEF DESCRIPTION OF THE DRAWING

The FIGURE is a schematic representation of a resin purger according to the present invention.

DESCRIPTION OF THE PREFERRED EMBODIMENT

Referring now to the FIGURE a container 10, preferably glass to observe any change in appearance, holds resin material 12 to be purged. A lid 14 covers the container 10 and provides an airtight seal 15, such as by an O-ring, with the container. The lid 14 is equipped with an inlet valve 16 and an outlet valve 18. An inert purge gas supply hose 20 is connected to the inlet valve 16 and an outlet hose 22 is connected to the outlet valve 18. A telescope extension 17 may be connected to the interior of the inlet valve 16 to allow close proximity of the inert purge gas, such as nitrogen, to the surface of the resin 12. The other end of the outlet hose 22 is connected to a first glass fiber cartridge filter 24. A diffuser 26 containing a copper sulfate compound 27 is connected to the first cartridge filter 24 and a second glass fiber cartridge filter 28 is connected to the other side of the diffuser. A probe sensor 30 is connected to the end of the second cartridge filter 28 to detect the presence of air ($O_2$) as it escapes through vents 32. The electrical signal from the probe sensor 30 is input via an electrical cable 34 to a meter 36 which displays the presence of air on a dial face 38. A telltale light 40 on the meter 36 indicates when purging is complete, i.e., no more air being detected by the probe sensor 30. For portability the meter 36 has a handle 37 and a probe and diffuser holder 39.

Since the sensitivity of the probe 30 dictates keeping the probe clean and moist, certain precautionary measures are taken. The cartridges 24 and 28 trap any particles or foreign materials from reaching the probe 30, and the diffuser 26 traps any resin and allows only the air from the container from reaching the probe which assists in keeping the probe moist. The diffuser 26 can keep the probe 30 moist for only a limited time, so a humidifier 42 is provided. The humidifier 42 is a water bottle with sponge layers 44 which keeps the probe 30 moist for long periods by transferring the probe to the humidifier between uses of the system.

With the resin 12 in the sealed container 10, the purge gas at a low flow rate, about 15-25 SCFH at 10-30 psig to prevent a turbulent effect on the resin, is input via the inlet valve 16 and the telescopic extension 17 across the surface of the resin. The telescopic extension 17 assures that a blanket of air does not remain on the resin surface when the meter dial 38 reads zero. The diffuser 26 is inserted into one end of the holder 39 and the probe 30 into the other end so that they are contiguous to each other. The exit gas from the outlet valve 18 travels along the outlet hose 22 through the first cartridge filter 24. The first cartridge filter 24 serves to retain the copper sulfate compound in the diffuser, to pre-screen the exit gas from the resin container 10, and to allow observation of the amount of resin that is in the exit gas. The exit gas then passes through the diffuser 26 which separates the residue of the resin from the exit gas, allowing almost pure gas to pass through the second cartridge filter 28. The diffuser 26 also keeps the probe 30 moist eliminating the need to wrap with a wet cloth, and provides a uniform mixture. Comparison of the first and second cartridge filters, 24 and 28, provides a before-and-after observation of the screening effect of the diffuser 26. The probe 30 detects the oxygen content in the exit gas from the diffuser 26 as the gas vents through outlets 32. The electrical signal from the probe 30, which is a function of the oxygen content of the exit gas, is conducted by cable 34 to the meter 36 where it is displayed on the dial face 38. When the air has been purged from the resin container 10, the indicator light 40 changes state, i.e., turns either on or off, or a buzzer sounds and the dial face 38 reads approximately zero. First the outlet and then the inlet hoses, 22 and 20, are removed from the container 10 to allow a small, positive pressure of the inert gas to develop in the container 10, resulting in a container of purged resin 12 into which no contaminating gas can return.

Therefore, the present invention provides a resin purging system which allows the purging to be terminated at the optimum moment without allowing contaminating gas to reenter the resin container.

What is claimed is:

1. Apparatus for purging atmospheric contaminants from a container in which a non-gaseous material is stored, which comprises:
   (a) means for sealing a container in which a non-gaseous material is stored to form a sealed chamber holding said stored material and gaseous contaminants associated therewith;
   (b) said means for sealing having an inlet valve having a first port communicating with said chamber and a second port, the opening of said inlet valve establishing communication between said first port and said second port and the closing of said inlet valve interrupting communication between said first port and said second port;
   (c) said means for sealing having an outlet valve having a first port communicating with said chamber and a second port, the opening of said outlet valve establishing communication between said first port and said second port and the closing of said outlet valve interrupting communication between said first port and said second port;
   (d) a source of a purge gas communicating with the second port of the inlet valve for supplying a stream of purge gas;
   (e) means for filtering material residue from a gaseous material, the input of said means for filtering being coupled to the second port of said outlet valve;
   (f) means for detecting the concentration of a contaminating gas in a gaseous material, said means for detecting coupled to the output of said means for filtering; and
   (g) means for displaying when the concentration of said contaminating gas detected by said means for detecting is below a preselected concentration; whereby
   the inlet valve may be opened to introduce a stream of purge gas into said chamber, the outlet valve may be opened to allow the gaseous contents of the chamber to be forced by the pressure of said stream of purge gas from the chamber and through the means for filtering and said means for detecting, and
   the outlet valve and the inlet valve may be sequentially closed when said means for displaying indicates that the concentration of oxygen in the gaseous material forced from the chamber is below a preselected concentration to terminate purging at the optimum moment without allowing the contaminants to re-enter the chamber.

2. Apparatus as recited in claim 1 wherein said means for filtering comprises:
   (a) a first glass fiber filter coupled to the second port of said outlet valve to pre-screen the material forced from said chamber;
   (b) a diffuser connected to said first filter to separate residue material from the material forced from said chamber; and
   (c) a second glass fiber filter connected to said diffuser.

3. Apparatus as recited in claim 1 further comprising a telescopic extension coupled to the first port of said inlet valve for extending said first port to close proximity to the surface of the non-gaseous material.

4. Apparatus as recited in claim 1 wherein said means for detecting comprises means for detecting the concentration of oxygen in a gaseous material.

5. Apparatus as recited in claim 4 wherein said means for filtering comprises:
   (a) a first glass fiber filter coupled to the second port of said outlet valve to pre-screen the material forced from said chamber;
   (b) a diffuser connected to said first filter to separate residue material from the material forced from said chamber; and
   (c) a second glass fiber filter connected to said diffuser.

6. Apparatus as recited in claim 5 wherein said means for detecting comprises a probe contiguous to said second filter for detecting the amount of oxygen in the material forced through the filtering means.

7. Apparatus as recited in claim 6 further comprising means for keeping said probe moist.

8. Apparatus as recited in claim 7 wherein said means for keeping said probe moist comprises hydrated copper sulfate contained within said diffuser.

9. Apparatus as recited in claim 7 wherein said means for keeping said probe moist comprises a water bottle and sponge layer, said probe being connected to said water bottle when said apparatus is not in use.

* * * * *